United States Patent [19]

Wang et al.

[11] Patent Number: 5,541,371
[45] Date of Patent: Jul. 30, 1996

[54] PALPABLY CONTROLLABLE DIGITAL PLATE

[75] Inventors: Min K. Wang, Hsinchu; Chau H. Lu, Tainan; Pao F. Chen, Taipei, all of Taiwan

[73] Assignee: Holtek Microelectronics Inc., Hsinchu, Taiwan

[21] Appl. No.: 69,997

[22] Filed: Jun. 1, 1993

[51] Int. Cl.⁶ .................................................. G08C 21/00
[52] U.S. Cl. ............................ 178/20; 345/173; 345/174
[58] Field of Search ................................. 178/15, 19, 20; 345/173, 174

[56] References Cited

U.S. PATENT DOCUMENTS 4,848,496  7/1989  Murakami et al. ................. 178/19
4,853,498  8/1989  Meadows et al. ............... 345/174 X
5,045,645  9/1991  Hoendervoogt et al. ............ 178/19
5,059,960  10/1991 Rosenberg et al. .............. 345/174
5,305,017  4/1994  Gerpheide .................... 345/174

*Primary Examiner*—Stephen Chin
*Assistant Examiner*—Paul Loomis
*Attorney, Agent, or Firm*—Christie, Parker & Hale

[57] ABSTRACT

A cost-effective and/or convenient digital plate being palpably controllable is provided. The digital plate includes an induction plate capable of inducing a change of a parameter when in contact with an object having a reactant property, a measurer for sensing the change, and a controller having an output for converting the change into a parametral information to be sent to the output.

27 Claims, 5 Drawing Sheets

PALPABLY CONTROLLABLE DIGITAL PLATE

BACKGROUND OF THE INVENTION

The present invention relates to a plate, and more particularly to a digital plate.

Conventional index input devices for the computer are generally categorized into two types:

1) The digital plate device 100, as shown in FIG. 1, includes an induction plate 101, an electronic pen 102 having a front coil 104 capable of generating a magnetic field of a low strength, and a controller 103. Induction plate 101 is a printed circuit board disposed therein metal rods 105 capable of inducing a current having a magnitude inversely proportional to the distance between metal rods (or wires) 105 and front coil 104 when electronic pen 102 comes close to induction plate 101. Thus, controller 103 can periodically read the current message of metal rods 105 to be converted into the actual coordinate position for pen 102 to be processed by the CPU 106 of a computer for accordingly moving the cursor in the monitor 107 of the computer.

Such type of index input device requires a special pen 102 so that it is relatively costly.

2) The mouse assembly 200, as shown in FIG. 2, includes 3 (or 2) functional keys L, M & F, a key detector 201, a movement detector 202 and a logic control device 203. Movement detector 202 has a counter and an optical coupler detecting the movement of mouse assembly 200 so that when assembly 200 moves, the optical coupler in detector 202 will generate a series of logic signals which have a frequency proportional to the moving speed of assembly 200 and trigger the counter to count until assembly 200 stops moving. What is recorded in the counter will be the coordinate movement of assembly 200. Whenever there is a movement of assembly 200 or a pressed functional key L, M or R, control device 203 will transmit in a specific format the key status and/or the movement of assembly 200 to be processed by CPU 106. Such type of index input device is now extensively used and is relatively cost-effective but can only provide 3 functional keys owing to the limited size of assembly 200 and cannot easily reach the corresponding position in monitor 107 as digital plate device 100 does so that it has limited control function and convenience in use.

It is therefore attempted by the applicant to deal with the shortcomings encountered by the prior art.

SUMMARY OF THE INVENTION

It is therefore an object of the present invention to provide a digital plate being cost-effective.

It is further an object of the present invention to provide a digital plate capable of being put in use without an electronic pen.

It is additional an object of the present invention to provide a digital plate capable of providing more functional keys.

According to the present invention, a palpably controllable digital plate includes an induction plate capable of inducing a change of a parameter when in contact with an object having a reactant property, a measurer for sensing the parameter change, and a controller for converting the change into a parametral information to be sent to the output thereof. The controller output can be connected to a computer interface and the induction plate can be disposed therein metal rods for induction purpose. The metal rods can be transverse and/or longitudinal in order that when in contact with the object, the change can be induced.

The measurer can be a resonance circuit device and the present digital plate can further include an oscillator for supplying an oscillating frequency to the resonance circuit device.

The object can be a capacitive pen so that the reactant property thereof is of a capacitive reactance.

If the parameter is reactance, the measurer can convert it into a power signal, e.g. a current or a voltage. Certainly, the present digital plate can further includes an analog/digital converter for receiving the power signal as an analog input to be converted into a digital output to be received by the controller as the parametral information being representative of a particular position or a translation of the object on the induction plate. The particular position can, be disposed thereat a functional key and the translation can be convertible into a movement of a cursor on a monitor.

Certainly, the present digital plate can further include a multiplexer for allowing the parameter to be correctly sent to the measurer.

The present invention may best be understood through the following description with reference to the accompanying drawings, in which:

DETAILED DESCRIPTION OF THE PREFERRED EMBODIMENT

Figure 1:
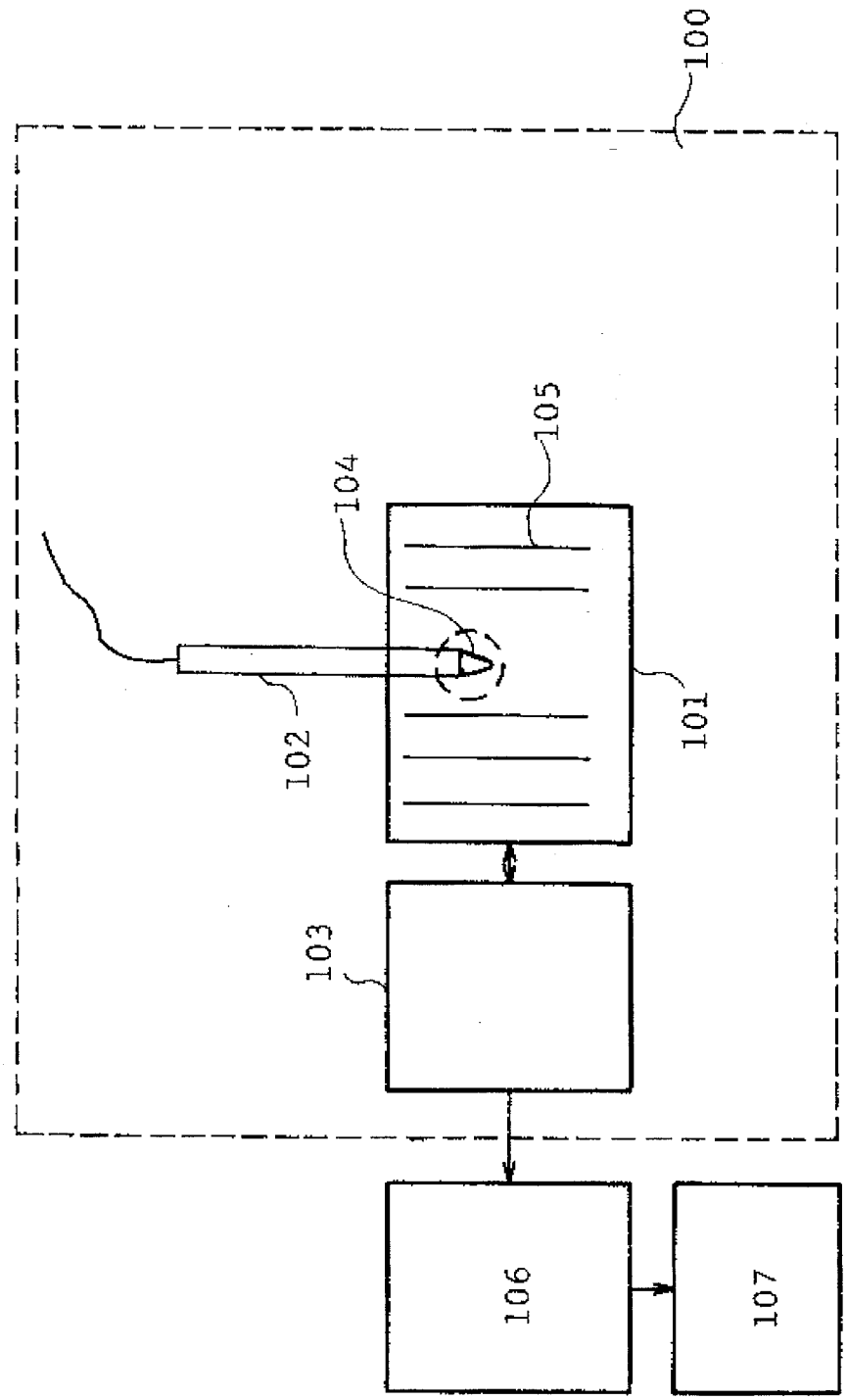
FIG. 1 is a block diagram showing a prior digital plate.
Figure 2:
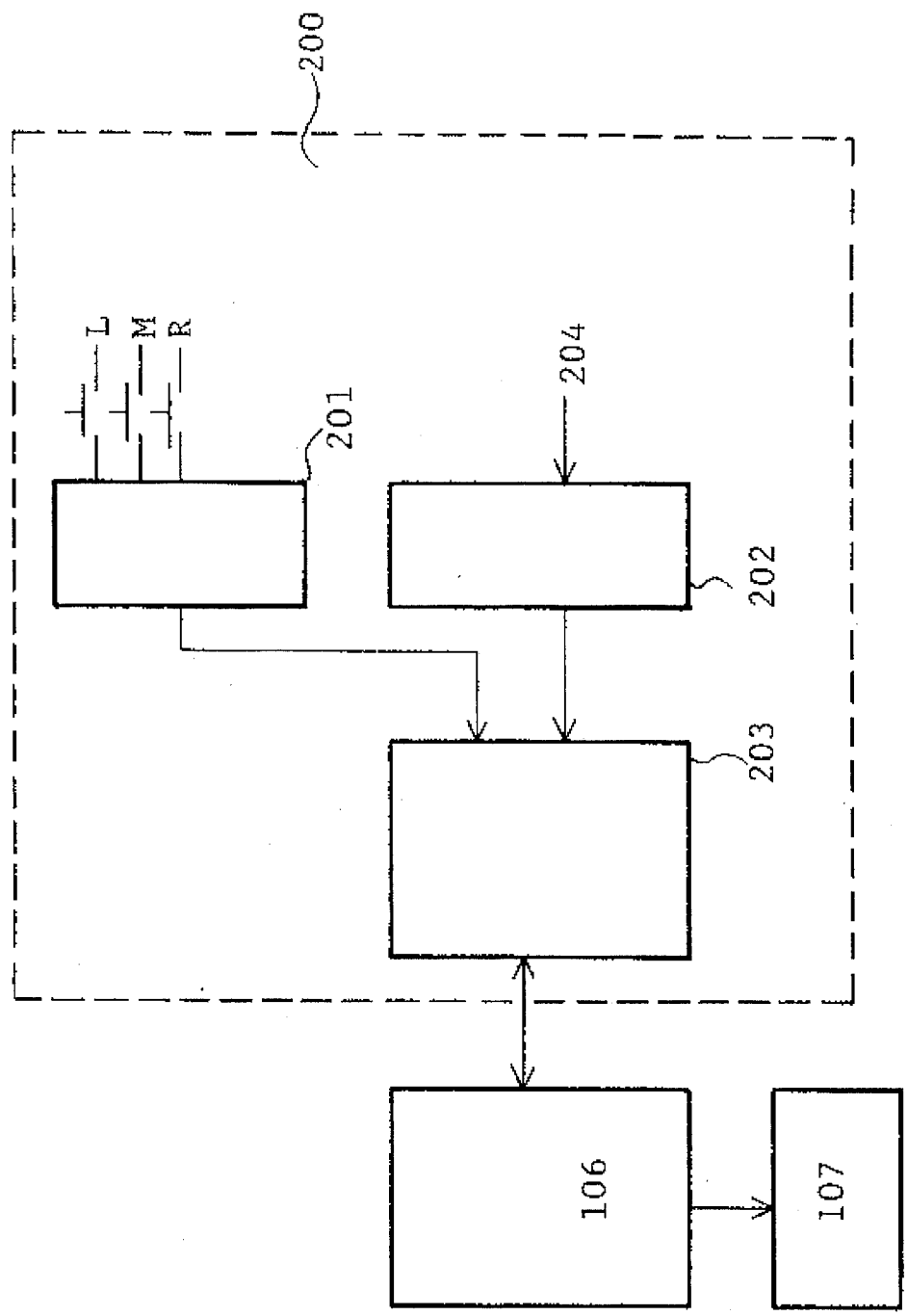
FIG. 2 is a block diagram showing a known mouse assembly.
Figure 3:
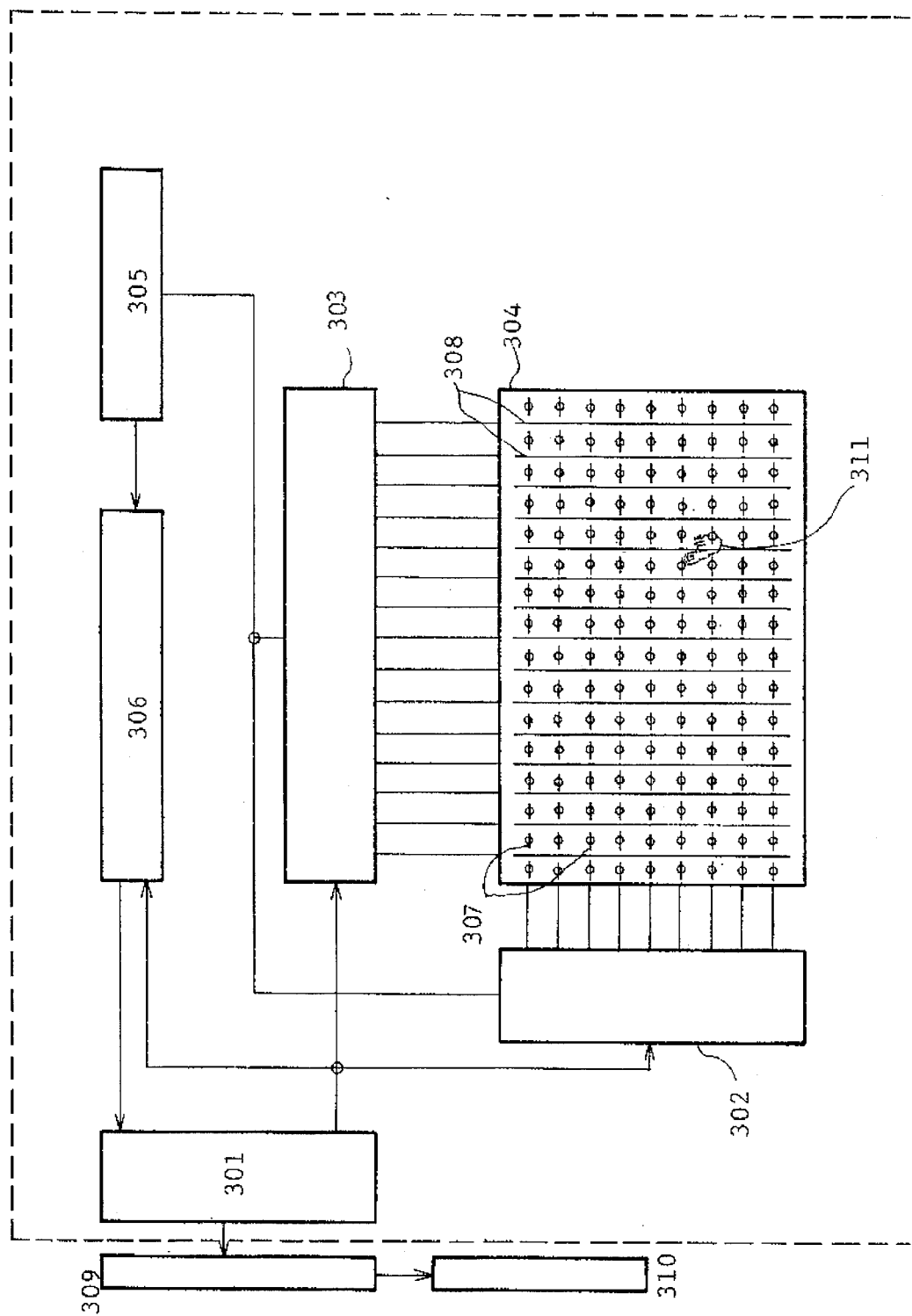
FIG. 3 is a block diagram showing a preferred embodiment of a digital plate according to the present invention.

Referring now to FIG. 3, a preferred embodiment of a palpably controllable digital plate according to the present invention includes a controller 301, two multiplexers 302, 303, an induction plate 304 disposed therein longitudinal and transverse metal rods or wires 307, 308 for inducing a change of a parameter when in contact with an object 311 having a reactant property, a measurer 305 and an analog/digital converter 306. Controller 301 sends scanning signals to multiplexers 302, 303 for sensing the status of each wire 307 (or 308). If we set the parameter to be the capacitance, the capacitance of each wire 307 (or 308) will change if the finger of a person comes in contact therewith. Measurer 305 measures the capacitance change of wire 307 (or 308) selected by multiplexer 302 (or 303) to be converted into an analog signal converted by A/D converter 306 into a digital signal operated by controller 301 to be transmitted in a particular format to be processed by a CPU 309 of a computer to be displayed on a monitor 310.

Figure 4:
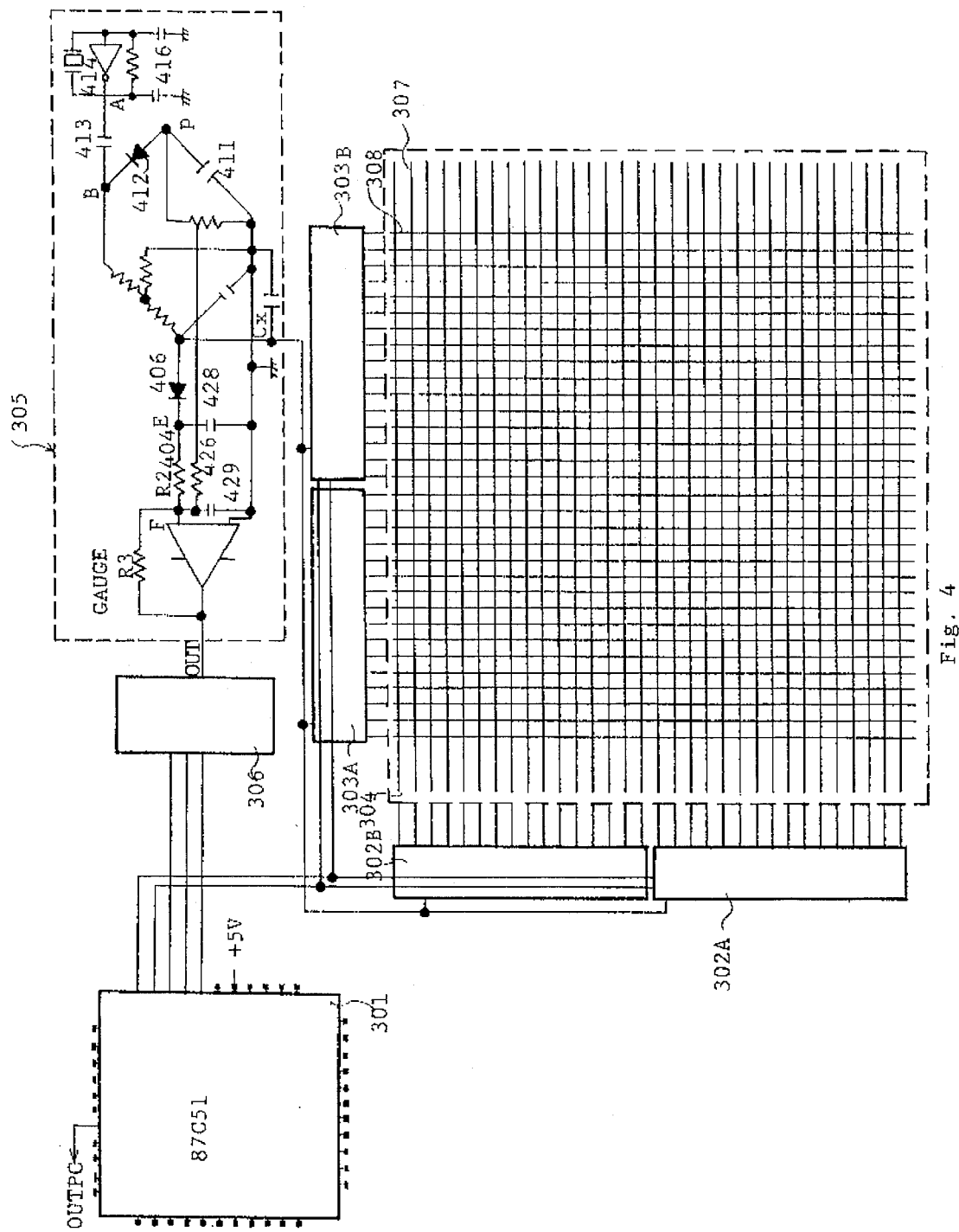
FIG. 4 is a circuit diagram for a digital plate according to the present invention.
Figure 5:
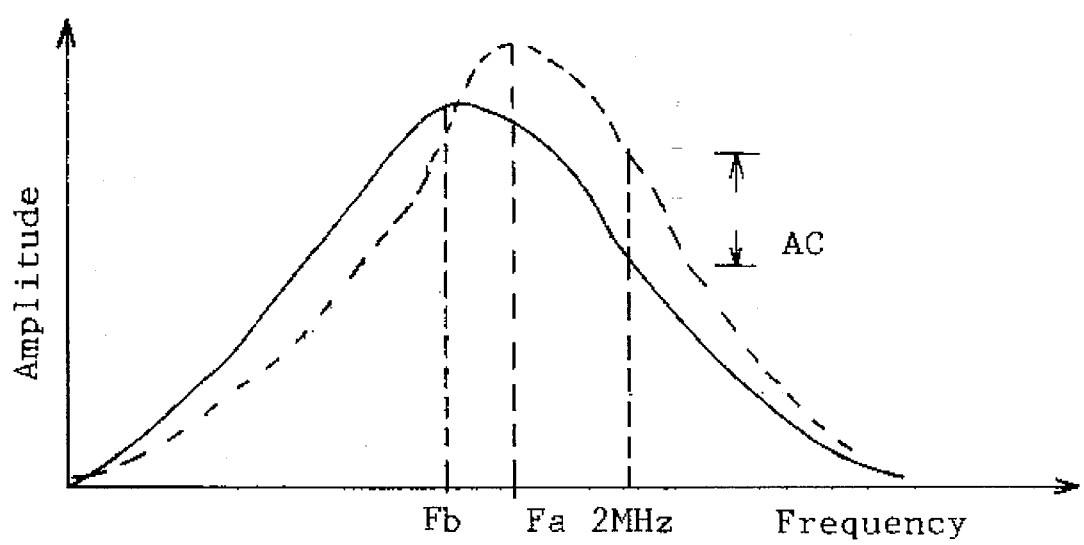
FIG. 5 is a wave diagram illustrating whether a digital plate according to the present invention is in contact with a capacitive object.

As shown in FIG. 4, controller 301 can be a 87C51 IC being a 8-bit microprocesser and outputting from the fifth and sixth pins thereof scanning signals to multiplexers 302A, 302B, 303A & 303B sequentially selecting metal wire 307 (or 308) to be connected to measurer 305 in which the capacitance of the capacitor Cx will change if there is a finger 311 comes in contact with selected metal wire 307 (or 308) so that the resonant frequency of measurer 305 will accordingly change. Thus, if an external 2 MH signal of a fixed frequency and a constant amplitude is applied to measurer 305, the output amplitude will change if the capacitance of capacitor Cx changes. As shown in FIG. 5, it illustrates that measurer 305 has a resonant frequency Fa if a finger does not come in contact with selected wire 307 (or 308) but will have a resonant frequency Fb if selected wire 307 (or 308) is contacted by a finger. ΔAc represents the amplitude variation of measurer 305 in response to the capacitance change of capacitor Cx.

A/D converter 306 can be a TLC548 IC. If 87C51 controller 301 detects there is a finger in contact with induction plate 304, it will, after operation, send in a specific format a parametral information representative of a particular position or a translation of the finger 311 on induction plate 304 to CPU 309. The particular position can represent an absolute position of the object 311 on induction plate 304 and can alternatively be disposed thereat a functional key. Certainly, the translation of finger 311 on induction plate 304 can be converted into the movement of the cursor on monitor 310. Since induction plate 304 has a relatively large area, it can provide a key region containing therein far more than 3 keys in order to be equipped with more diversified functions.

As shown in FIG. 4, an oscillator 414 supplies an oscillating frequency to resonant circuit device 305 having a separating capacitor 413 for separating the DC signal. The diode 412 and the capacitor 411 are used to filter and rectify the negative half cycle signal at the point B to generate a negative voltage at the point D. The diode 406 and the capacitor 428 are used to filter and rectify the positive half cycle signal to generate a positive voltage at the point E. Resistors 404 & 426 and the capacitor 429 are used to add together and filter the signals at points E & D. Since the signal at point E has been processed by the resonant circuit, the signal will change in accordance with whether finger 311 is in contact with selected metal wire 307 (or 308). Although the signal at point D is not processed by the resonant circuit, the signal at point F will still change according to whether finger 311 is in contact with selected wire 307 (or 308) since the signal at point F is a resultant of the signal at point E and the signal at point D so that we can know whether finger 311 is in contact with selected wire 307 (or 308) by only detecting the status of the output of resonant circuit device 305.

While the invention has been described in connection with what are presently considered to be the most practical and preferred embodiments, it is to be understood the invention needs not be limited to the disclosed embodiments but on the contrary, it is intended to cover various modifications and similar arrangements included within the spirit and scope of the appended claims which scope is to be accorded the broadest interpretation so as to encompass all such modifications and equivalent structures reasonably deemed by those skilled in the art.

What we claim is:

1. A palpably controllable digital plate comprising:
   an induction plate disposing therein a plurality of longitudinal metal rods and a plurality of transverse metal rods for inducing a change of a parameter when in contact with an object having a reactant property totally accounting for an induction of said change;
   a resonant circuit device electrically connected to said induction plate for sensing said change;
   an oscillator electrically connected to said resonant circuit device for supplying an oscillating frequency to said resonant circuit device; and
   a controller electrically connected to said resonant circuit device and having an output for converting said change into a parametrial information to be sent to said output.

2. A digital plate according to claim 1 wherein said output is adapted to be electrically connnected to an interface of a computer.

3. A digital plate according to claim 1 wherein said change is induced by a plurality of said transverse and longitudinal rods being in contact with said object.

4. A digital plate according to claim 1 wherein said object is capacitive.

5. A digital plate according to claim 4 wherein said object is a finger of a person.

6. A digital plate according to claim 4 wherein said object is a capacitive pen.

7. A digital plate according to claim 1 wherein said reactant property is of a capacitive reactance.

8. A digital plate according to claim 1 wherein said parameter is reactance.

9. A digital plate according to claim 1 wherein said resonant circuit device converts said parameter into a power signal.

10. A digital plate according to claim 9 wherein said power signal is a current.

11. A digital plate according to claim 9 wherein said power signal is a voltage.

12. A digital plate according to claim 9, further comprising an analog/digital converter electrically connected between said resonant circuit device and said controller for receiving said power signal as an analog input to be converted into a digital output.

13. A digital plate according to claim 12, further comprising a multiplexer electrically connected between said induction plate and said resonant circuit device for allowing said parameter to be correctly sent to said resonant circuit device.

14. A digital plate according to claim 12 wherein said controller receives said digital output as said parametral information.

15. A digital plate according to claim 14 wherein said parametral information is representative of a particular position of said object on said induction plate.

16. A digital plate according to claim 15 wherein said particular position is disposed thereat a functional key.

17. A digital plate according to claim 14 wherein said parametral information is representative of a translation of said object on said induction plate.

18. A digital plate according to claim 17 wherein said translation is convertible into a movement of a cursor on a monitor.

19. Apparatus for indicating position on a surface comprising:
   a plurality of electrically reactive elements positionally arranged in an orthogonal matrix in proximity to the surface such that finger contact with the surface changes the reactance of an element near the finger;
   a source of high frequency oscillations;
   a resonant circuit connected to the source, the resonant circuit having a resonant frequency near the frequency of the oscillations;
   means for sequentially coupling the elements to the resonant circuit in a predetermined order to change the resonant frequency in accordance with the reactance of the coupled element;
   means for sensing in the predetermined order changes in the amplitude of the oscillations caused by changes in the resonant frequency to ascertain the position of finger contact on the surface; and means for recording the changes in amplitude.

20. The apparatus of claim 19, in which the reactive elements are capacitors.

21. The apparatus of claim 20, in which the capacitors are longitudinal and transverse metal rods.

22. The apparatus of claim 21, in which the oscillations have a fixed frequency and a constant amplitude.

23. The apparatus of claim 22, in which the recording means comprises a computer.

24. The apparatus of claim 23, in which the recording means additionally comprises a display monitor.

25. The apparatus of claim 19, in which the oscillations have a fixed frequency and a constant amplitude.

26. The apparatus of claim 19, in which the recording means comprises a computer.

27. The apparatus of claim 26, in which the recording means additionally comprises a display monitor.

\* \* \* \* \*